(12) United States Patent
Reichert

(10) Patent No.: US 7,064,616 B2
(45) Date of Patent: Jun. 20, 2006

(54) MULTI-STAGE NUMERIC COUNTER OSCILLATOR

(75) Inventor: Peter Reichert, Thousand Oaks, CA (US)

(73) Assignee: Teradyne, Inc., Boston, MA (US)

(*) Notice: Subject to any disclaimer, the term of this patent is extended or adjusted under 35 U.S.C. 154(b) by 188 days.

(21) Appl. No.: 10/748,488

(22) Filed: Dec. 29, 2003

(65) Prior Publication Data

US 2005/0146360 A1   Jul. 7, 2005

(51) Int. Cl.
*H03L 7/00* (2006.01)
(52) U.S. Cl. .................. 331/1 A; 331/16; 327/105; 375/302; 708/271; 708/276
(58) Field of Classification Search ............. 375/302; 327/105; 331/1 A, 16; 708/271, 276
See application file for complete search history.

(56) References Cited

U.S. PATENT DOCUMENTS

2005/0135524 A1* 6/2005 Messier .................. 375/354

FOREIGN PATENT DOCUMENTS

| EP | 0 312 370 A3 | 4/1989 |
| EP | 0 416 869 A2 | 3/1991 |
| EP | 0 459 446 A1 | 12/1991 |
| EP | 1 215 558 A2 | 6/2002 |

OTHER PUBLICATIONS

European Search Report, Mailing Date Mar. 17, 2005.

* cited by examiner

*Primary Examiner*—Arnold Kinkead

(57) ABSTRACT

A numeric counter oscillator is disclosed comprising a quotient accumulator and a remainder accumulator. The quotient accumulator has a programmable input for receiving a QUOTIENT value, a reference clock input and a multi-bit output. The output is adapted for transmitting an output value OUT representing an accumulated quotient sum. The multi-bit output increments by a predetermined amount in response to each reference clock period. The remainder accumulator comprises programmable inputs for receiving respective REMAINDER and DIVISOR values, a reference clock input and a multi-bit output representing an accumulated digital remainder sum less than a predefined digital integer. The remainder accumulator further comprises a comparator having a first input for receiving a programmed divisor value, and a second input for receiving the remainder accumulator multi-bit output. The comparator is operative to generate an increment carry signal for application to the quotient accumulator when the remainder multi-bit output reaches the predefined integer value.

26 Claims, 4 Drawing Sheets

FIG. 3

REMAINDER ACCUMULATOR

| CYCLE | ACCUM | ADD | SUB | CARRY |
|---|---|---|---|---|
| 0 | 0 | 1 | X | 0 |
| 1 | 1 | 2 | X | 0 |
| 2 | 2 | 3 | 0 | 1 |
| 3 | 0 | 1 | X | 0 |
| 4 | 1 | 2 | X | 0 |
| 5 | 2 | 3 | 0 | 1 |
| 6 | 0 | 1 | X | 0 |
| 7 | 1 | 2 | X | 0 |
| 8 | 2 | 3 | 0 | 1 |

QUOTIENT ACCUMULATOR

| ACCUM | ADD | ADD CARRY |
|---|---|---|
| 0 | 3 | 0 |
| 3 | 6 | 0 |
| 6 | 9 | 1 |
| 10 | 13 | 0 |
| 13 | 16 | 0 |
| 16 | 19 | 1 |
| 20 | 23 | 0 |
| 23 | 26 | 0 |
| 26 | 29 | 1 |

MULTI-STAGE NUMERIC COUNTER OSCILLATOR

FIELD OF THE INVENTION

The invention relates generally to automatic test equipment, and more particularly high accuracy digital counter circuits.

BACKGROUND OF THE INVENTION

Numerical counter oscillators (NCO), or accumulators, are convenient multi-bit registers that increment a summed value in response to a periodic input signal, such as a digital clock waveform. One application for an NCO is in a technique known as direct-digital-synthesis, often used to generate a variable frequency clock.

Direct-digital-synthesis (DDS) for generating variable frequency clocks are well-known in the art and, as shown in FIG. 1, generally involve driving the input of an NCO 10 with a digital clock signal 12. The counter incrementally advances with each subsequent clock period.

Each multi-bit count value is mapped to a sine value look-up table or memory 14 for a digital representation of an analog sine wave phase angle. The digital representation is then fed through a digital-to-analog converter (DAC) 16 where the accumulating phase angle results in a complete sinusoidal analog waveform. Further conditioning of the analog signal by a filter 18 and a phase-locked-loop (PLL) 20 often occurs to form the desired clock.

Conventionally, the frequency of the desired end waveform typically relies on the accuracy of the NCO. The degree of accuracy is typically characterized by the equation $F_{NCO}=F_{ref}(A/B)$, where $F_{NCO}$ is the desired frequency and $F_{ref}$ is the digital input clock frequency. The "A" and "B" terms together represent a ratio of $F_{ref}$ to $F_{NCO}$. The "B" term traditionally represents a binary divisor dependent on the number of output bits N in the NCO.

In other words, the ratio A/B forces a $1/2^N$ resolution when programming a desired clock frequency $F_{NCO}$. The resulting problem is that a user desiring to program a variable frequency clock to, for example, one gigahertz, because of the limited number of available values for "B", might have to accept a frequency of 1.001 gigahertz. In some applications, such as automatic test equipment, this level of inaccuracy is problematic.

What is needed and currently unavailable is an NCO that provides a high level of accuracy that correspondingly allows more flexibility in frequency resolution for variable frequency clock generators and other circuits that utilize NCOs. The NCO described herein satisfies these needs.

SUMMARY

The numeric counter oscillator described herein provides a unique way to achieve high accuracy and repeatability for circuits that use direct-digital-synthesis techniques.

To realize the foregoing advantages, the numeric counter oscillator in one form comprises a numeric counter oscillator comprising a quotient accumulator and a remainder accumulator. The quotient accumulator has a programmable input for receiving a QUOTIENT value, a reference clock input and a multi-bit output. The output is adapted for transmitting an output value OUT representing an accumulated quotient sum. The multi-bit output increments by a predetermined amount in response to each reference clock period. The remainder accumulator comprises programmable inputs for receiving respective REMAINDER and DIVISOR values, a a reference clock input and a multi-bit output representing an accumulated digital remainder sum less than a predefined digital integer. The remainder accumulator further comprises a comparator having a first input for receiving a programmed divisor value, and a second input for receiving the remainder accumulator multi-bit output. The comparator is operative to generate an increment carry signal for application to the quotient accumulator when the remainder multi-bit output reaches the predefined integer value.

Other features and advantages of the present invention will be apparent from the following detailed description when read in conjunction with the accompanying drawings.

BRIEF DESCRIPTION OF THE DRAWINGS

The invention will be better understood by reference to the following more detailed description and accompanying drawings in which

FIG. 3 is a table showing various values at different points in the improved NCO of FIG. 2 for each clock cycle.

DETAILED DESCRIPTION

The numeric counter oscillator (NCO) described herein provides a way to maximize the accuracy of an oscillator output with respect to a desired frequency ratio between two clock frequencies. This enables a flexible choice of resolution in the NCO output for use with a variable frequency clock, or timestamp as more fully described below.

Figure 1:
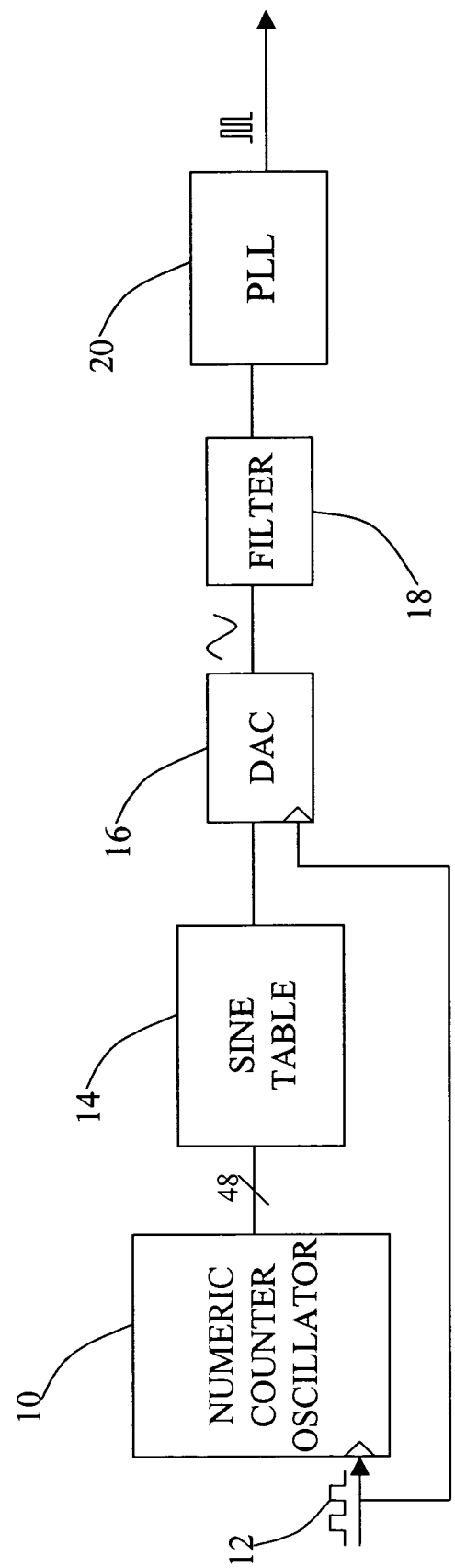
FIG. 1 is a high-level block diagram of a conventional circuit for generating a variable frequency clock.
Figure 2:
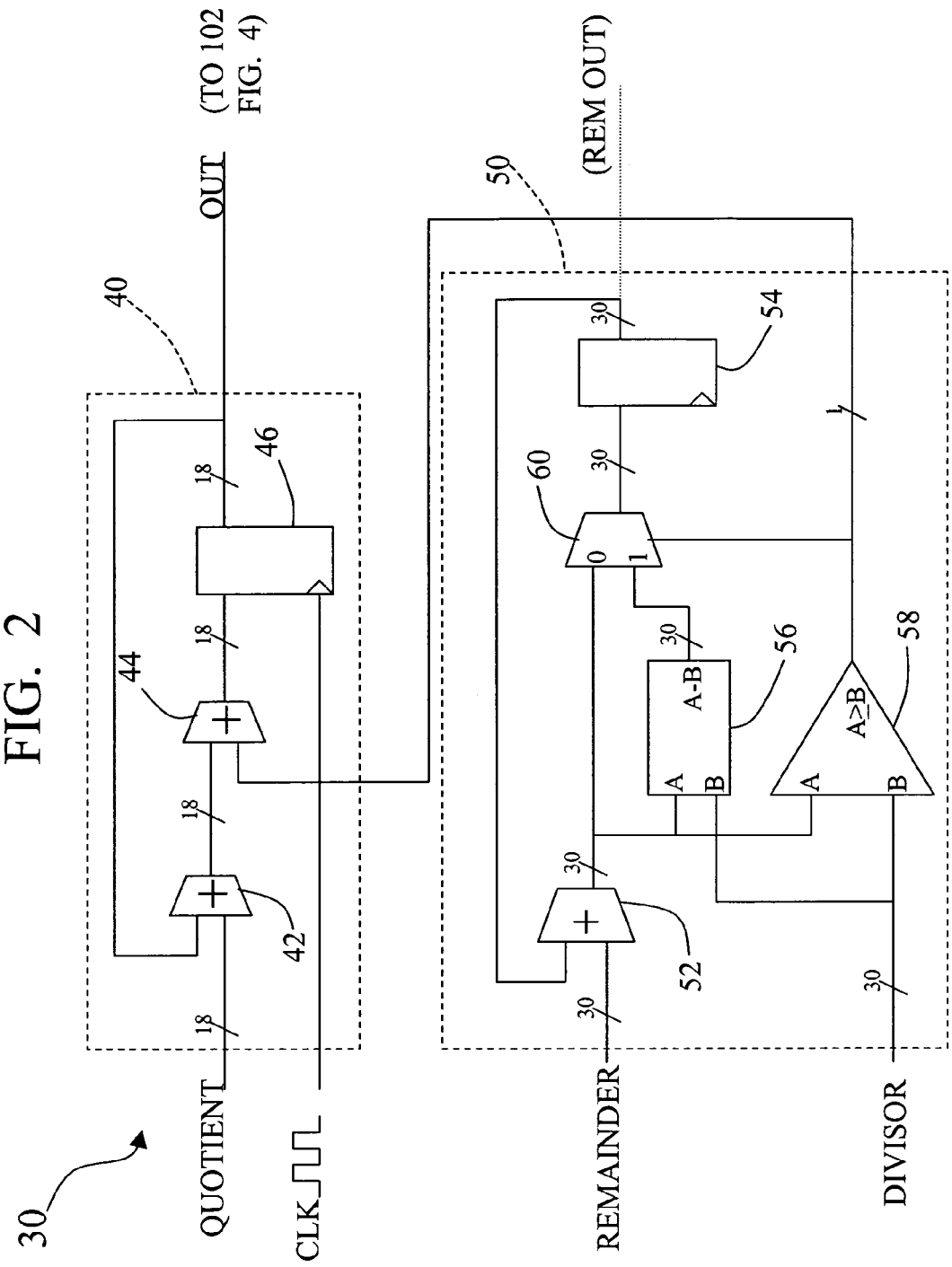
FIG. 2 is a block diagram of an improved numerical counter oscillator.

Referring now to FIG. 2, the multi-stage numerical counter oscillator, generally designated 30, comprises a quotient accumulator 40 and a remainder accumulator 50. The remainder accumulator complements the quotient accumulator to allow for flexible clock frequency resolution programming.

Further referring to FIG. 2, the quotient accumulator includes a first adder 42 that receives at one input an eighteen-bit quotient value QUOTIENT, and an eighteen bit input fed back from the accumulator output OUT. The first adder feeds a second adder 44 with the result of the summed QUOTIENT and OUT values. The second adder sums the QUOTIENT/OUT with a carry input from the remainder accumulator 50. The output from the second adder is shifted into a multi-bit register 46 clocked by input clock CLK. The output of the register OUT may then be used as the accumulator input. Because register 46 has a finite number of bits, the output will be computed with modular arithmetic. For example, if register 46 has N bits, the output will be computed modulo N.

With continued reference to FIG. 2, the remainder accumulator 50 includes a third adder 52 that receives a thirty-bit remainder input REMAINDER, along with an increment value from a second multi-bit register 54. The output of the third adder is fed as an input to a subtractor 56 and a comparator 58. A thirty-bit divisor value DIVISOR provides a second input for the subtractor and comparator. A multiplexer 60 includes a control input coupled to the comparator output to selectively pass the subtractor output or the third adder output to the second register 54.

FIG. 3 illustrates a cycle-by-cycle example of how the multi-stage NCO operates. This example assumes a desired ratio between the desired frequency $F_{NCO}$ and the reference frequency $F_{REF}$ of 10/3. This assumption results in a programmed quotient of three (3), a remainder of one (1), and a divisor of three (3). With the assumptions above as one example, at cycle zero (0), the remainder accumulator has an incremental value of zero, with the quotient accumulator output incremented by three (3). With cycle 1, the remainder accumulator increments by one (1), resulting in an adder output of two (2). The quotient accumulator increments by three (3) again, for an output value, at the adder, of six (6).

With continued reference to FIG. 3, at cycle 2 (the third clock pulse), the adder input is incremented to generate a value of three (3) at the input to the subtractor and the comparator. Since both inputs to the comparator are equal, a carry signal is generated and fed to the quotient accumulator (the second adder input). The carry value is added with the incrementing three (3) on the fourth clock pulse. As a result, the output OUT exhibits a ten (10).

The entire carry-generation process repeats every three (3) cycles (the DIVISOR value) to produce an accurate counter output OUT. As a result, the resolution of the clock is programmable to a very fine resolution, for example, to one hertz. Of course, the QUOTIENT, REMAINDER, and DIVISOR input values are entirely programmable by a user in establishing the desired frequency ratio, More generally, multiplexor 60 provides the accumulated value A as an input to register 54 in any clock cycle in which the value of A is less than the DIVISOR value B. However, in any cycle in which the accumulated value A exceeds the value B. multiplexor 60 provides the value of A minus B as an input to register 54. In this way, the value in register 54 increases either REMAINDER value using modular arithmetic with a modulus of B. The value of REM OUT thus may be described to increase modulo B.

Figure 4:
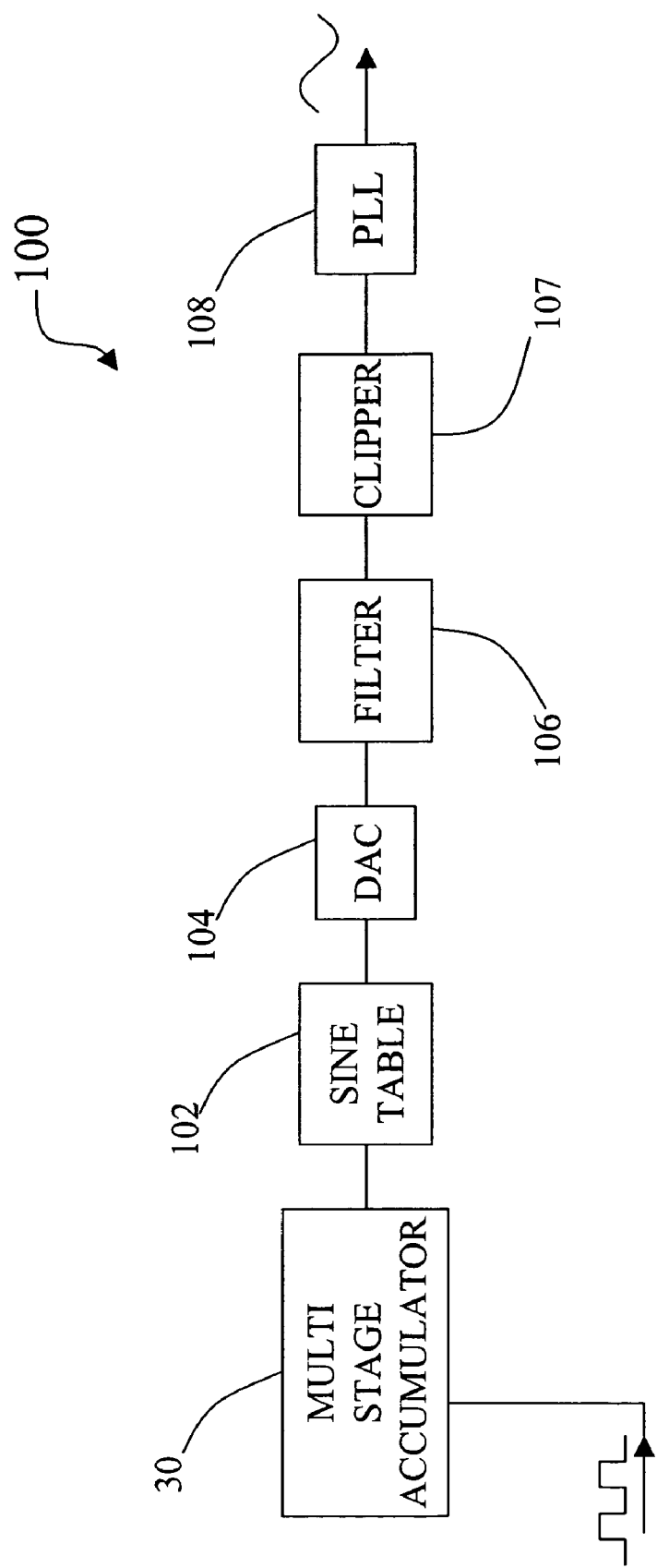
FIG. 4 is a high-level block diagram of a variable frequency clock generator employing the improved numeric counter oscillator of FIG. 2.

With reference now to FIG. 4, the NCO 30 in one application may be conveniently employed in a variable frequency clock generator, generally designated 100, utilizing direct-digital-synthesis techniques well-known to those skilled in the art, and briefly described earlier herein. The NCO feeds its high-accuracy output to a look-up sine table 102 having amplitude values for phase input. Each accumulated amplitude value is then fed to a digital-to-analog converter (DAC) 104 where a stepped analog waveform results. The waveform is then smoothed and processed by a filter 106 and clipped by a clipper 107 to make a clock. Preferably, a phase-locked-loop 108 further filters the waveform for optimum fidelity.

In another application, and referring back to FIG. 2, the NCO 30 may be employed as a standard circuit block to generate timestamp data. Timestamps are often useful for establishing relative timings between signal occurances or events. For this application, both of the accumulator outputs are used such that the quotient accumulator output represents integers of a specified unit of time, such as nanoseconds.

Those skilled in the art will recognize the many benefits and advantages afforded by the present invention. Of significant importance is the dual accumulator aspect of the NCO, which enables the quotient to be regularly corrected during operation. This allows for a high degree of resolution flexibility for applications such as variable frequency waveform generation and timestamping.

While the invention has been particularly shown and described with reference to the preferred embodiments thereof, it will be understood by those skilled in the art that various changes in form and detail may be made therein without departing from the spirit and scope of the invention.

What is claimed is:

1. A numeric counter oscillator comprising:
a quotient accumulator, the quotient accumulator having a programmable input for receiving a QUOTIENT value, a reference clock input and a multi-bit output, the output adapted for transmitting an output value OUT representing an accumulated quotient sum, the multi-bit output incrementing in response to each reference clock period;
a remainder accumulator, the remainder accumulator having programmable inputs for receiving respective REMAINDER and DIVISOR values, a reference clock input and a multi-bit output representing an accumulated digital remainder sum less than a predefined digital integer, the remainder accumulator further comprising:
a) an arithmetic circuit having an output representing accumulated remainder values; and
b) circuitry having a first input for receiving a programmed divisor value, and a second input for receiving the output of the arithmetic circuit, the circuitry operative to generate an increment carry signal for application to the quotient accumulator when the remainder multi-bit output of the arithmetic circuit exceeds a value dependent on the programmed divisor value.

2. A numeric counter oscillator according to claim 1 wherein the quotient accumulator comprises:
a register having a clock input for receiving the input reference clock signal;
a first summing stage for receiving the quotient value input, and comprising a second input coupled to the quotient accumulator output; and
a second summing stage disposed in series with the first summing stage and having an input coupled to the output of said circuitry in the remainder accumulator to receive the increment carry signal, the second summing stage further comprising an output coupled to the input of the register.

3. A numeric counter oscillator according to claim 1 wherein:
(i) the circuitry of the remainder accumulator comprises;
a subtractor having an output and a pair of inputs for receiving, respectively, the output of the arithmetic circuit and the DIVISOR value; and
a multiplexer having a first switched input connected to the output of the arithmetic circuit and a second switched input connected to the output of the subtractor, and a control input connected to the increment carry signal; and
(ii) the remainder accumulator additionally comprises a second register for incrementing the remainder accumulator output in response to the input clock, wherein the remainder value and the output of the second register are provided as inputs to the arithmetic circuit.

4. A numeric counter oscillator for providing a numerical solution to the relationship A/B, where B comprises a DIVISOR, and the decimal solution comprises a QUOTIENT+REMAINDER, the numerical counter oscillator comprising:
means for generating a remainder sum in response to a REMAINDER input value and a DIVISOR input value, the means for generating a remainder sum comprising means for generating a carry signal based on the relative values of the remainder sum and the DIVISOR input value;

means for accumulating a quotient sum in response to an input QUOTIENT value and for adjusting the quotient sum in response to the carry signal.

5. A numeric counter oscillator according to claim 4 wherein the means for accumulating a quotient sum comprises:

a quotient accumulator, the quotient accumulator having a programmable input for receiving a QUOTIENT value, a reference clock input and a multi-bit output, the output adapted for transmitting an output value OUT representing an accumulated quotient sum, the multi-bit output incrementing by a predetermined amount in response to each reference clock period.

6. A numeric counter oscillator according to claim 4 wherein the means for accumulating a remainder sum comprises:

a remainder accumulator, the remainder accumulator having programmable inputs for receiving respective REMAINDER and DIVISOR values, a reference clock input and a multi-bit output representing an accumulated digital remainder sum less than a predefined digital integer, the remainder accumulator further comprising a comparator having a first input for receiving a programmed divisor value, and a second input for receiving the remainder accumulator multi-bit output, the comparator operative to generate the carry signal.

7. A method of generating a desired numeric counter oscillator frequency based on a reference frequency, the desired frequency and reference frequency having the relationship A/B, where B comprises a DIVISOR, and the relationship may be expressed as a QUOTIENT+REMAINDER, the method including the steps:

generating a reference clock having the reference frequency and period;

incrementing a first accumulator at times related to the period of the reference clock, the first accumulator having a QUOTIENT input and an output for keeping track of an accumulated sum;

incrementing a second accumulator at times related to the period of the reference clock, the second accumulator having a divisor input DIVISOR, the second accumulator tracking a remainder sum; and comparing a value derived from the remainder sum to the DIVISOR input, and when said value reaches the DIVISOR value, generating a carry increment for accumulation in the first accumulator.

8. A method of generating a variable frequency clock having a desired clock frequency, the method using the method of claim 7 and further comprising:

a) specifying values of the QUOTIENT, REMAINDER and DIVISOR to provide the desired clock frequency; and b) using the output of the first accumulator to control a direct digital synthesis circuit.

9. A method of generating a variable frequency clock having a desired clock frequency, the method using the method of claim 7 and further comprising:

a) specifying values of the QUOTIENT, REMAINDER and DIVISOR to provide the desired clock frequency;

b) using the output of the first accumulator to select a value representative of a point on a periodic wave form;

c) converting the selected values to an analog signal; and d) conditioning the analog signal to provide a clock.

10. A variable frequency clock generator using the numeric counter oscillator of claim 1, additionally comprising:

a) a look-up table coupled to the output of the quotient accumulator, the look-up table providing output values representing entries in the table indexed by the output of the quotient accumulator;

b) a digital to analog converter having a digital input coupled to the output of the look-up table; and c) a conditioning circuit coupled to the output of the analog to digital converter, the output of the conditioning circuit providing a variable frequency clock.

11. The variable frequency clock generator of claim 10 wherein the look-up table stores values representing samples of a sine wave.

12. The variable frequency clock generator of claim 10 wherein the conditioning circuit comprises a filter, a clipping circuit, and a phase locked loop.

13. A variable frequency clock generator, comprising:

a) a numeric counter oscillator, comprising:
i) a first control input;
ii) a second control input;
iii) a clock input;
iv) a digital output having a value that changes at a plurality of times correlated to the clock input, wherein at a first subset of said times, the value of the digital output changes in proportion to the value of the first control input and, at a second subset of said plurality of times, the value of the digital output changes in proportion to the value of the first control input combined with an adjustment value, the timing of the second subset of said plurality of times depending on the value of the second control input;

b) a conversion circuit having an input and a digital output, the input coupled to the output of the numeric counter oscillator and the digital output of the conversion circuit taking on a value dictated by the input;

c) a digital to analog converter having a digital input coupled to the digital output of the conversion circuit and an analog output; and d) a conditioning circuit having an analog input connected to the output of the digital to analog circuit and an output providing a second clock with a frequency that varies in relation to the value of the first control input and/or the second control input.

14. The variable frequency clock generator of claim 13 wherein the numeric counter oscillator comprises a third control input, and the timing of the second subset of times is selected in response to the values of the second control input and the third control input.

15. The variable frequency clock generator of claim 14 wherein the value of the first, second and third control inputs are selected from a desired ratio wherein the value of the first control input is the whole number quotient when the ratio is evaluated as a fraction, the value of the second control input is the whole number remainder when the quotient is computed and the value of the third control input is the divisor when the quotient is computed.

16. The variable frequency clock generator of claim 14 wherein the value of the first, second and third control inputs are selected from a desired ratio wherein the value of the first control input is the whole number quotient when the ratio is evaluated as a fraction, the value of the second control input is the divisor when the quotient is computed and the value of the third control input is the whole number remainder when the quotient is computed.

17. The variable frequency clock generator of claim 15 wherein the frequency of the second clock is proportional to the frequency of the clock multiplied by the ratio.

18. The variable frequency clock generator of claim 13 wherein the clock input is a fixed frequency clock.

19. The variable frequency clock generator of claim 13 wherein the conversion circuit is a lookup table.

20. The variable frequency clock generator of claim 19 wherein the lookup table stores a series of values defining a cycle of a periodic waveform.

21. The variable frequency clock generator of claim 20 wherein the periodic waveform is a sinusoid.

22. The variable frequency clock generator of claim 13 wherein the digital output of the numeric counter oscillator has a maximum value N and increases to the value of the digital output are computed modulo N.

23. The variable frequency clock generator of claim 13 wherein the variable frequency clock generator operates to produce a periodic signal through direct digital synthesis.

24. Automatic test equipment employing the variable frequency clock generator of claim 13.

25. The variable frequency clock generator of claim 14 wherein the numeric counter oscillator comprises:

a) a first accumulator, increasing by the value of the first control input at the first subset of the plurality of times, and b) a second accumulator, increasing by the value of the second control input at the first plurality of times;

c) wherein the second subset of the plurality of times is determined by the value in the second accumulator increasing beyond the value of the third control input and at the second subset of the plurality of times, i) the value in the second accumulator is set to the value in the second accumulator minus the value of the third control input and ii) the value in the first accumulator is increased by the value of the first control input plus one.

26. The variable frequency clock generator of claim 25 wherein, a) the first accumulator increases values modulo N, N being a predetermined value; and b) the second accumulator increases in value modulo B, where B is a value selected based on the value of the third control input.

* * * * *